United States Patent …

(12) United States Patent
Simon et al.

(10) Patent No.: US 9,861,949 B2
(45) Date of Patent: Jan. 9, 2018

(54) PROCESS FOR PRODUCING AN ANTI-EROSION COATING ON AN INNER WALL OF A CHAMBER OF A FCC UNIT AND ANCHORING STRUCTURE FOR THE PRODUCTION OF THIS COATING

(71) Applicant: TOTAL RAFFINAGE CHIMIE, Courbevoie (FR)

(72) Inventors: Hubert Simon, Le Havre (FR); Marc Bories, Saint Jouin de Bruneval (FR)

(73) Assignee: TOTAL RAFFINAGE CHIMIE, Courbevoie (FR)

( * ) Notice: Subject to any disclaimer, the term of this patent is extended or adjusted under 35 U.S.C. 154(b) by 501 days.

(21) Appl. No.: 14/408,457

(22) PCT Filed: Jun. 27, 2013

(86) PCT No.: PCT/FR2013/051503
§ 371 (c)(1),
(2) Date: Dec. 16, 2014

(87) PCT Pub. No.: WO2014/009625
PCT Pub. Date: Jan. 16, 2014

(65) Prior Publication Data
US 2015/0147236 A1    May 28, 2015

(30) Foreign Application Priority Data

Jul. 10, 2012 (FR) ..................... 12 56622

(51) Int. Cl.
*B01J 8/00*     (2006.01)
*B01J 8/18*     (2006.01)
(Continued)

(52) U.S. Cl.
CPC ............... *B01J 8/24* (2013.01); *B01J 8/1872* (2013.01); *B32B 3/12* (2013.01); *B32B 13/06* (2013.01);
(Continued)

(58) Field of Classification Search
CPC ..... B01J 8/00; B01J 8/18; B01J 8/1872; B01J 8/24; B01J 19/00; B01J 19/24;
(Continued)

(56) References Cited

U.S. PATENT DOCUMENTS 6,393,789 B1    5/2002  Lanclos
6,887,551 B2 *  5/2005  Hyde ................. B32B 3/12
                                              110/336
(Continued)

FOREIGN PATENT DOCUMENTS

EP    0 180 553 A1    5/1986
IT    1195244 B       12/1981

OTHER PUBLICATIONS

International Search Report of PCT/FR2013/051503 dated Sep. 10, 2013.
(Continued)

*Primary Examiner* — Natasha Young
(74) *Attorney, Agent, or Firm* — Sughrue Mion, PLLC (57) ABSTRACT

A process for producing an anti-erosion coating on an inner or outer metal wall of a chamber of a fluid catalytic cracking unit, comprising:
(i) the shaping of a honeycomb metal anchoring structure, said anchoring structure being formed from a plurality of strips connected in pairs by joining assembly portions of these strips so as to form a plurality of cells between two adjacent strips,
(ii) the fastening of said anchoring structure by welding to said metal wall, so that each cell of the anchoring
(Continued)

structure is welded to the wall of the chamber at least at the junctions between the contiguous assembly portions of two adjacent strips, and (iii) the insertion of a composite material into the cells from the metal wall and at least up to the upper longitudinal edge of each strip.

18 Claims, 3 Drawing Sheets

(51) Int. Cl.
| | |
|---|---|
| *B01J 19/00* | (2006.01) |
| *B01J 19/24* | (2006.01) |
| *B32B 3/00* | (2006.01) |
| *B32B 3/10* | (2006.01) |
| *B32B 3/12* | (2006.01) |
| *B32B 13/00* | (2006.01) |
| *B32B 13/06* | (2006.01) |
| *B32B 15/18* | (2006.01) |
| *C10G 11/14* | (2006.01) |
| *C10G 11/18* | (2006.01) |
| *B32B 15/04* | (2006.01) |
| *F23M 5/00* | (2006.01) |
| *F23M 5/04* | (2006.01) |
| *F27D 1/10* | (2006.01) |
| *F27D 1/14* | (2006.01) |
| *B01J 8/24* | (2006.01) |
| *B32B 13/04* | (2006.01) |
| *B32B 15/00* | (2006.01) |
| *C10G 11/00* | (2006.01) |
| *F27D 1/00* | (2006.01) |

(52) U.S. Cl.
CPC .......... *B32B 15/043* (2013.01); *B32B 15/18* (2013.01); *C10G 11/18* (2013.01); *C10G 11/182* (2013.01); *F23M 5/00* (2013.01); *F23M 5/04* (2013.01); *F27D 1/10* (2013.01); *F27D 1/141* (2013.01); *B01J 2208/00884* (2013.01); *B01J 2219/0218* (2013.01); *B01J 2219/0236* (2013.01); *B32B 2255/06* (2013.01); *B32B 2307/714* (2013.01); *B32B 2307/752* (2013.01); *F23M 2900/05002* (2013.01); *F23M 2900/05004* (2013.01); *Y10T 29/49618* (2015.01)

(58) Field of Classification Search
CPC .................. B01J 2208/00796; B01J 2208/00823–2208/00884; B01J 2219/02; B01J 2219/0204; B01J 2219/0218; B01J 2219/0236; B32B 3/00; B32B 3/10; B32B 3/12; B32B 13/00; B32B 13/04; B32B 13/06; B32B 15/00; B32B 15/04; B32B 15/043; B32B 15/18; B32B 2255/00; B32B 2255/06; B32B 2307/00; B32B 2307/70; B32B 2307/714; B32B 2307/752; C10G 11/00; C10G 11/14; C10G 11/18; C10G 11/182; F23M 5/00; F23M 5/04; F23M 2900/00; F23M 2900/05002; F23M 2900/05004; F27D 1/00; F27D 1/10; F27D 1/14; F27D 1/141; Y10T 29/49; Y10T 29/49616; Y10T 29/49618

See application file for complete search history.

(56) References Cited

U.S. PATENT DOCUMENTS

| | | | |
|---|---|---|---|
| 7,178,299 B2* | 2/2007 | Hyde | .......... E04C 5/04 428/44 |
| 2004/0226251 A1 | 11/2004 | Hyde et al. | |
| 2004/0229001 A1 | 11/2004 | Hyde et al. | |

OTHER PUBLICATIONS

Russian Grant Decision issued in counterpart Application No. 2015104111/05 (006455).

* cited by examiner

PROCESS FOR PRODUCING AN ANTI-EROSION COATING ON AN INNER WALL OF A CHAMBER OF A FCC UNIT AND ANCHORING STRUCTURE FOR THE PRODUCTION OF THIS COATING

This is a National Stage of International Application No. PCT/FR2013/051503, now published as WO 2014/009625, filed Jun. 27, 2013, claiming priority based on French Patent Application No. 12 56622, filed Jul. 10, 2012, the contents of all of which are incorporated herein by reference in their entirety.

The invention relates to a process for producing an anti-erosion coating on an inner or outer wall of a chamber of a fluid catalytic cracking (FCC) unit.

The invention relates in particular to a process for producing an anti-erosion coating on a wall of a cyclone, plenum or disengager that is part of a fluid catalytic cracking unit.

The invention also relates to an anchoring structure suitable for producing an anti-erosion coating with the process according to the invention.

Fluidized-bed catalytic cracking (FCC) is a chemical process, frequently used in oil refineries, the purpose of which is to convert heavy cuts containing long hydrocarbon chains, for example resulting from the vacuum distillation of oil, into lighter and more upgradable cuts. A high temperature combined with the presence of a specific catalyst, and a slight overpressure with respect to atmospheric pressure, makes it possible to crack (break) the large hydrocarbon molecules in order to produce smaller molecules that are highly upgradable, for example in the production line of petroleum products.

The catalyst generally used is a zeolite with cationic substitutions of rare earths maintained within an amorphous silica-alumina matrix. Owing to the extremely small dimensions of its grains (of the order of about 50 microns), this catalyst may be set in "fluid" or "quasi-fluid" motion in the FCC reaction zone.

In the FCC process, the feedstock to be treated and the catalyst are introduced together into a reactor, the temperature of which may reach several hundreds of degrees centigrade, for example from 520° C. to 550° C. The gaseous effluents exiting the reactor and that are formed during the chemical reaction are separated from the solid and coked catalyst particles in a disengager located downstream of the reactor. One or more cyclones positioned in the disengager may supplement the separation of the catalyst particles and of the gaseous effluents.

The chemical reaction produced in the FCC reactor leads to the formation of coke deposits on the catalyst particles. This necessitates a continuous regeneration of this catalyst. It is for this purpose that provision is made in the FCC unit for, continuously, a flow of the coked catalyst to a regenerator into which combustion air is blown at a temperature of around 200/220° C., in order to burn the coke. The temperatures used inside the regenerator for burning the coke are of the order of 720° C. to 760° C. The hot catalyst thus regenerated, which can be likened to a new catalyst, is then reinjected at the inlet of the reactor with the fresh feedstock.

It is this continuous and fluid movement of regeneration of the catalyst which gives its name to the FCC process.

Although the catalyst stripped of its coke is discharged continuously at the bottom part of the regenerator, there remain significant amounts of solid particles of said catalyst entrained at the top outlet of said regenerator by the combustion gas containing, in particular, carbon dioxide ($CO_2$), nitrogen ($N_2$), carbon monoxide (CO), nitrogen oxides (NOx) and sulphur oxides (SOx), or even oxygen ($O_2$). This combustion gas is then treated by various means in energy-recovery units in order in particular to lower its temperature, then is ejected via a chimney. It is extremely important that the catalyst particles are almost completely, or even completely absent from this combustion gas, which requires the presence, at the top outlet of the regenerator, of a suitable device for separating and recovering these particles. In the same way as in the reactor and for the separation of the catalyst particles with the gaseous effluents formed during the cracking reaction, at least one stage of cyclones is used in the regenerator, preferably two stages of primary and secondary cyclones installed in series in order to separate and recover the catalyst particles contained in the combustion gas.

The metal walls of the disengager, of the regenerator and of the internal equipment located in the regenerator or the disengager, in particular the cyclones, may undergo erosion due to the circulation of the catalyst particles, and, at the regenerator, a massive and rapid corrosion by the combustion gases. It is therefore necessary to protect them in order to lengthen their service life.

The metal walls of the chambers and of the equipment inside these chambers of a catalytic cracking unit are thus covered with a coating intended to protect them mainly from erosion. Such coatings generally consist of a composite material, for example a concrete, held by an anchoring structure, which is usually metallic. These anchoring structures are welded to the metal walls and thus provide the attachment of the composite material. They may have a honeycomb shape comprising a plurality of hexagonal cells firmly attached to one another by their side. The anchoring structure is then welded to the metal wall by welding only some of the cells to the metal wall. Customarily, one cell in four is welded to the metal wall. Each cell is then filled with composite material. This configuration of the coating thus also makes it possible to ensure the absorption of the expansion differences that exist between the metal anchoring structure and the composite material.

Certain existing honeycomb anchoring structures consist of strips connected in pairs. Each strip is divided along its length into a plurality of portions, first strip portions extending in a first plane parallel to the longitudinal direction of the strip, second strip portions extending in a second plane parallel to the first plane and different therefrom, third strip portions each connecting a first strip portion to a second strip portion. The first and second strip portions are alternated over the entire length of the strip. For the production of an anchoring structure of this type, the first portions of a strip are juxtaposed and connected to the second portions of an adjacent strip by fastening means so as to form cells. Each cell is thus delimited by a first portion of a strip and its two adjacent third portions and by the juxtaposed second portion of the strip and its two adjacent third portions. The fastening means are, for example, rivets, pins, staples or similar fastening means that pass through orifices of the strips to be connected. Currently, the various specifications set a maximum gap of the order of 0.2 mm between two connected strip portions.

Since the walls of the chambers and of the equipment inside these chambers to be covered are often cylindrical, these anchoring structures must be shaped, for example by roll bending, in order to have a radius of curvature suitable for the wall to which they must be fastened.

Such a coating makes it possible to protect the metal walls of FCC units. However, over time a degradation of this coating is observed which may lead to fragments of coating dropping inside the chambers or the internal equipment and require the shutdown of the installation in order to replace the coating.

The degradations observed may have several causes depending on the operating conditions of the chamber in question.

The disengager or the cyclones located in the disengager are in contact with the gases resulting from the cracking of the feedstock. These gases get between the interstices of the coating and lead to the formation of coke inside these interstices, and more particularly at the junction of two juxtaposed strips of the anchoring structure. This formation of coke may lead to a significant detachment of the coating during successive cooling/heating cycles of the chamber: the gaps that exist between the composite material and its anchoring structure are indeed filled in by the coke so that these shrinkage gaps can no longer play their role that consists in absorbing the differences in expansion between the anchoring structure and the composite material. This results in the formation of compression lines, cracks or even a detachment of the composite material filling the cells of the anchoring structure.

In a regenerator or in the equipments inside a regenerator, especially the cyclones, the metal walls are in contact with catalyst particles and with a gas containing, amongst others, oxygen, oxides of carbon, sulphur and nitrogen. This gas penetrates through the interstices of the coating and causes sulphidation, carburization and oxidation phenomena, in particular at the welds that fasten the metal anchoring structure to the metal walls.

Irrespective of the degradation phenomena observed, corrosion, especially by sulphidation, carburization or oxidation, or formation of coke, the applicant has observed that these phenomena essentially occur at the metal anchoring structure and/or its bonding via welding to the metal walls, and more particularly at juxtaposed strip portions of the anchoring structure that are firmly attached by the fastening means.

Document EP 180 553 also states that a phenomenon of corrosion and of erosion is often observed at the spaces located between the juxtaposed strip portions, these spaces being created by the deformations resulting from the shaping into a cylinder or similar of the honeycomb anchoring structure. Corrosion/erosion is observed at these spaces since the composite material may find it difficult to penetrate therein. In order to solve this problem, document EP 180 553 proposes to produce omega ($\Omega$)-shaped cut-outs on the portions of strips which are not juxtaposed to another adjacent strip. These omega-shaped cut-outs are positioned so as to open onto the lower edge and onto the upper edge of the strip portion in question. Such cut-outs facilitate the shaping of the honeycomb structure and prevent the formation of the spaces at which corrosion/erosion is observed.

Although the anchoring structure described in document EP 180 553 makes it possible to produce a reinforced coating in which the spaces between the strips forming the anchoring structure are of small size or nonexistent, the surrounding gases may however still penetrate between the strips of the structure and give rise to corrosion/coke formation at the interstices that exist between the strips of the anchoring structure and the metal wall to which the anchoring structure is welded.

Document CA632486 describes a honeycomb anchoring structure formed of juxtaposed strips, in which the heights of the juxtaposed and connected strip portions are not the same, so that, when the composite material fills the cells, it covers the lowest strip height which makes it possible to limit the introduction of corrosive liquid between the two strips at their juxtaposition. The corrosion induced by the surrounding gases is not mentioned.

There is therefore a need for a coating that is more resistant to degradation phenomena, in particular to corrosion, especially by sulphidation, carburization, oxidation, or coke formation.

The invention aims to overcome these drawbacks by providing a process for producing an anti-erosion coating on an inner or outer metal wall of a chamber of a fluid catalytic cracking unit, comprising:
  (i) the shaping of a honeycomb metal anchoring structure, said anchoring structure being formed from a plurality of strips connected in pairs so as to form a plurality of cells between two adjacent strips, in which each strip is divided along its length into a plurality of portions, including at least one series of assembly portions extending in a same plane and connected to a series of assembly portions of an adjacent strip by fastening means, each strip having a lower longitudinal edge contained in a single plane before shaping and an upper longitudinal edge, during this shaping step, the lower longitudinal edges of the strips of said anchoring structure being adapted in order to follow the shape of said metal wall,
  (ii) the fastening of said anchoring structure to said metal wall, the lower longitudinal edges of the strips of the anchoring structure being in contact with the metal wall,
  (iii) the insertion of a composite material into the cells of said anchoring structure from the metal wall and at least up to the upper longitudinal edge of each strip,
in which the step (ii) of fastening the anchoring structure to the metal wall is carried out by welding to the metal wall of at least one part of the lower longitudinal edges of the strips so that each cell of the anchoring structure is welded to the metal wall at least at the junctions between the contiguous assembly portions of two adjacent strips.

The process for producing a coating according to the invention makes it possible to easily install a barrier that opposes the progression and the replenishment of gaseous species in the confining spaces separating the contiguous portions of strips forming the anchoring structure. The capacity for adaptation and flexibility in terms of the respective expansion of the composite material and of the metal structure can thus be retained. Moreover, the procedures for manufacturing, shaping and installing the anchoring structure on the metal walls to be protected are identical to existing procedures. Finally, the installation of the composite material (generally by hand) also remains unchanged with respect to the use of existing anchoring structures.

The fact that each cell of the anchoring structure is welded to the wall of the chamber, in particular at the junctions between the assembly portions of two adjacent strips of the anchoring structure, makes it possible in particular to reduce the risks of penetration of corrosive gas up to the junction between the anchoring structure and the chamber wall, between two adjacent strips of the anchoring structure, thus limiting the corrosion at this junction.

The production of a lower longitudinal edge contained in a single plane for each strip of the anchoring structure before the shaping step, makes it possible to facilitate the welding of this longitudinal edge to a metal wall.

Advantageously, at least one of the welds produced during step (ii) at the junction of the contiguous assembly portions of two adjacent strips, extends over the entire length of at least one of the strip portions adjacent to the assembly portions. This may make it possible to further reduce the risks of introducing corrosive gas between the anchoring system and the metal wall at the junctions of two adjacent strips.

The honeycomb structure used in the process according to the invention is advantageously produced from stainless steel (a stainless steel contains at most 1.2% by weight of carbon and at least 10.5% by weight of chromium according to the standard EN10008). In particular, the stainless steel will be chosen so as to withstand the environment of the chamber in which the anchoring structure must be used.

In certain applications, for example as a coating in regenerator cyclones, serious degradations of the stainless steel used for honeycomb structures has been observed.

It would appear that beneath the outer layer of chromium oxide, the chromium content of the steel decreases during use until it reaches a value of less than 10.5% by weight. However, steel loses its stainless nature when its chromium content is less than 10.5% by weight: rapid oxidation of the steel may then occur.

In addition, the formation of carbides was also observed and appears to have been the cause of microcracks within the steel.

In order to prevent or limit this type of degradation, the strips of the anchoring structure used in step (i) may advantageously be made of austenitic stainless steel chosen from the following steels:
  a stainless steel containing from 0.04% to 0.10% by weight of carbon, from 17% to 19% of chromium and from 9% to 12% of nickel, and with a niobium content of from 8 times the carbon content to 1% by weight, for example a steel of grade AISI 347,
  a steel containing at most 0.015% by weight of carbon, from 15% to 17% of chromium and from 33% to 37% of nickel, for example a steel of grade AISI 330,
  a steel containing at most 0.10% by weight of carbon, from 24% to 26% of chromium and from 19% to 22% of nickel, for example a steel of grade AISI 310.

Advantageously and non-limitingly, the anchoring structure used in step (i) is such that the upper longitudinal edge of each strip is formed from a succession of straight sections that are parallel to the lower longitudinal edge, the upper longitudinal edge alternately comprising low sections that are a distance h away from the lower longitudinal edge and high sections that are a distance H, greater than the distance h, away from the lower longitudinal edge, at least one part of the low sections forming the upper edge of at least one part of the assembly portions so that, when two adjacent strips are connected, each assembly portion of a strip comprises an upper longitudinal edge a distance apart from its lower longitudinal edge that is different from the distance separating the upper longitudinal edge from the lower longitudinal edge of the assembly portion of the adjacent strip to which it is connected, over the entire length of the connected assembly portions.

During the step (iii) of inserting the composite material into the cells of said anchoring structure, the composite material then fills the cells from the metal wall and at least up to the high sections of the upper longitudinal edges of the strips of the anchoring structure. Such a covering of the anchoring structure with a composite material up to the height H of the high sections of the upper longitudinal edge, above the height h of the low sections of the upper longitudinal edge, may make it possible to prevent the penetration of a fluid, in particular of a gas, between the assembly portions of juxtaposed strips, while making it possible to obtain an anchoring structure that has homogeneous mechanical properties over its entire surface due to the alternation of the high and low sections, so that the stresses generated by its shaping will be homogeneous.

Advantageously and non-limitingly, each strip of the anchoring structure used in step (i) is such that the difference H-h between the distances H and h is from 4 to 10 mm, preferably from 6 to 8 mm. Such a difference in the distances is generally sufficient to enable a coverage, with a composite material, of the space that exists between the juxtaposed and connected portions of two adjacent strips, and to thus prevent the penetration of a fluid into this space.

Advantageously and non-limitingly, all the strips of the anchoring structure used in step (i) are identical. This may make it possible to obtain an anchoring structure having particularly homogeneous mechanical properties over its entire surface due to the use of identical strips, so that the stresses generated by its shaping will be particularly homogeneous and so that the anchoring structure obtained will have a good deformability. The use of identical strips also makes it possible to reduce the manufacturing costs with respect to anchoring structures comprising different parts, or one or two parts in order to form each cell as described, for example, in document CA632486.

In a first embodiment described in this document CA632486, one strip in two has a lower height over each portion intended to be juxtaposed and connected to an adjacent strip, the other strips having a uniform height over their entire length. This configuration may however make the shaping of the anchoring structure by roll bending more difficult and lead to the formation of different stresses within the metal during the shaping of the structure. In other embodiments described in this document CA632486, each cell is formed from one strip or from two strips, which requires the production and assembly of a large number of parts for the formation of an anchoring structure formed of a plurality of cells.

Advantageously and non-limitingly, the metal wall on which the coating is applied is an inner or outer wall of a cyclone, a regenerator, a disengager or any other internal equipment of a fluid catalytic cracking unit.

The composite material, within the meaning of the present invention, is preferably a material that results from an assembly of at least two immiscible materials having a high adhesive strength. Preferably, the composite material is a composite building material such as a concrete, in particular a concrete suitable for use in a fluid catalytic cracking unit.

According to one particular embodiment of the process according to the invention, each strip of the anchoring structure used in step (i) can be divided along its length into a plurality of portions, first strip portions extending in a first plane parallel to the longitudinal direction (L) of the strip, second strip portions extending in a second plane parallel to the first plane and different from the first plane, third strip portions each connecting a first strip portion to a second strip portion, the first and second strip portions being alternated over the entire length of the strip and the first portions of a strip being juxtaposed and connected to the second portions of an adjacent strip by fastening means so as to form hexagonal cells.

Such a hexagonal shape of the cells makes it possible to produce a particularly strong anchoring structure. Moreover, the assembly of two strips makes it possible to obtain a plurality of cells.

The anchoring structure of this particular embodiment may then have one of the following configurations, which is particularly simple to produce:

the low sections may extend over the entire length of each first portion and the high sections may extend over the entire length of each second portion, or the low sections may extend over the entire length of each second portion, and the high sections may extend over the entire length of each first portion.

Generally and advantageously, for each strip of the anchoring structure used in step (i) of the process according to the invention, the upper longitudinal edge of each assembly portion is identical and formed from a succession of at least one high section and of at least one low section, all the strips of the anchoring structure being identical, which makes it possible to simplify the production of the strip.

In particular, the upper longitudinal edge of each assembly portion (for example of a first and of a second portion), may be formed from a single high section and from a single low section. The two high and low sections of an assembly portion (for example of a first or second portion) may be of the same length or preferably of different length, which makes it possible to prevent any overlapping between the high sections of the connected assembly portions of two juxtaposed strips. This is because an overlap could favour the introduction of gas between the connected portions, which is undesirable.

Advantageously and non-limitingly, the upper longitudinal edge of the strip portions (for example of the third strip portions of the particular embodiment), located between the assembly portions of the strips, is a distance H away from the lower longitudinal edge.

The upper longitudinal edge of each strip may advantageously have rounded junctions between the high sections and the low sections. This makes it possible to avoid injuries during the handling of these anchoring structures, and in particular during the manual filling thereof for their use in chambers of fluid catalytic cracking units.

Advantageously and non-limitingly, a flap of material may be cut out of at least one portion other than an assembly portion (for example from a third strip portion of the particular embodiment) and bent in order to jut out from this portion. Such a configuration may make it possible to improve the anchoring of the composite material to the anchoring structure, the flap then being embedded in the composite material, the holding of which is also reinforced due to the fact that it passes through the orifice freed up by the folded flap.

The flaps of material from portions that are part of one and the same cell may be folded towards one another. This arrangement makes it possible to obtain two flaps folded towards the centre of each cell when the strips are connected to one another.

These flaps may also be folded so as to extend substantially parallel to the planes of the strip assembly portions.

The various configurations described above are particularly advantageous when all the strips of the anchoring structure are identical.

The invention also relates to a honeycomb metal anchoring structure for the production of an anti-erosion coating on an inner or outer metal wall of a chamber of a fluid catalytic cracking unit. This anchoring structure is formed from a plurality of identical strips connected in pairs so as to form a plurality of cells between two adjacent strips, in which each strip is divided along its length into a plurality of portions, including at least one series of assembly portions extending in a same plane and connected to a series of assembly portions of an adjacent strip by fastening means, each strip having a lower longitudinal edge contained in a single plane and an upper longitudinal edge. The upper longitudinal edge of each strip is formed from a succession of straight sections that are parallel to the lower longitudinal edge, the upper longitudinal edge alternately comprising low sections that are a distance h away from the lower longitudinal edge and high sections that are a distance H, greater than the distance h, away from the lower longitudinal edge, at least one part of the low sections forming the upper edge of at least one part of the assembly portions so that, when two adjacent strips are connected, each assembly portion of a strip comprises an upper longitudinal edge a distance apart from its lower longitudinal edge that is different from the distance separating the upper longitudinal edge from the lower longitudinal edge of the assembly portion of the adjacent strip to which it is connected, over the entire length of the connected assembly portions.

Thus, at any point (along the longitudinal direction of the strips) of two juxtaposed and fastened assembly portions, the height of these portions is different, which guarantees that the upper longitudinal edges of the two assembly portions are not juxtaposed.

The particular configuration of the anchoring structure according to the invention has the advantage of enabling a coverage of the anchoring structure with a composite material up to the height H of the high sections of the upper longitudinal edge of one strip, above the height h of the low sections of the upper longitudinal edge of an adjacent strip, so as to prevent the penetration of a gas, between the juxtaposed assembly portions of the two strips, while making it possible to obtain an anchoring structure that has homogeneous mechanical properties over its entire surface due to the alternation of the high and low sections, so that the stresses generated by the shaping thereof will be homogeneous.

Moreover, the shaping of the anchoring structure according to the invention will be able to be carried out with the same equipment as that used for anchoring structures for which the strip height is identical over the entire length of the strip, and by applying similar forces.

The production of a lower longitudinal edge contained in a single plane (before any shaping of the anchoring structure) makes it possible to facilitate the welding of this longitudinal edge to a metal chamber wall.

Since each strip is made from a single part (no fastening between the various portions of one and the same strip), the anchoring structure according to the invention may be produced with a reduced number of parts. The assembly of two strips comprising n assembly portions each makes it possible to obtain (n−1) cells.

The dimensions of the anchoring structure will be able to be adjusted as a function of the number of strips connected and of the length thereof. The fastening means may in particular consist of flaps of material cut out from a first portion of one strip and penetrating into a corresponding orifice of a second portion of a juxtaposed strip. This type of fastening is, for example, described in document U.S. Pat. No. 3,033,086. In document IT1195244, two flaps from a first portion of a strip are introduced into an orifice of a second portion of an adjacent strip, these flaps then being pressed against this second strip.

According to one particular embodiment, each strip of the anchoring structure may be divided along its length into a plurality of portions, first strip portions extending in a first plane parallel to the longitudinal direction (L) of the strip, second strip portions extending in a second plane parallel to the first plane and different from the first plane, third strip portions each connecting a first strip portion to a second strip portion, the first and second strip portions being alternated over the entire length of the strip and the first portions of a strip being juxtaposed and connected to the second portions of an adjacent strip by fastening means so as to form hexagonal cells.

In this particular embodiment, the first and second strip portions form assembly portions.

In particular, the low sections may then extend over the entire length of each first portion and the high sections may extend over the entire length of each second portion, all the strips of the anchoring structure being identical.

Whatever the embodiment, the anchoring structure may have one or more of the following features:
- the upper longitudinal edge of each assembly portion of two adjacent strips may advantageously be identical and formed from a succession of at least one high section and at least one low section;
- the upper longitudinal edge of the strip portions located between the assembly portions is a distance H away from the lower longitudinal edge;
- the upper longitudinal edge of each strip has rounded junctions between the high sections and the low sections;
- the difference H-h between the distances H and h is from 4 to 10 mm, preferably from 6 to 8 mm;
- the strips are made of austenitic stainless steel chosen from the following steels:
  - a stainless steel containing from 0.04% to 0.10% by weight of carbon, from 17% to 19% of chromium and from 9% to 12% of nickel, and with a niobium content of from 8 times the carbon content to 1% by weight,
  - a steel containing at most 0.015% by weight of carbon, from 15% to 17% of chromium and from 33% to 37% of nickel,
  - a steel containing at most 0.10% by weight of carbon, from 24% to 26% of chromium and from 19% to 22% of nickel;
- a flap of material is cut out from at least one strip portion other than an assembly portion and folded back in order to jut out from this portion;
- the flaps of material from portions that are part of one and the same cell may be folded towards one another.

Another subject of the invention relates to an anti-erosion coating comprising a honeycomb anchoring structure according to the invention embedded in a composite material, the composite material filling each cell from the lower longitudinal edge of each strip up to the upper longitudinal edge over a distance at least equal to the distance H separating the high sections from the lower longitudinal edge.

The composite material may be as described above with reference to the process, for example a concrete.

Another subject of the invention relates to a chamber of a fluid catalytic cracking unit, comprising at least one inner or outer wall covered with at least one coating according to the invention, the lower longitudinal edge of each strip of the anchoring structure of the coating being fastened by welding to the inner or outer wall of the chamber.

This chamber may be a chamber of a cyclone, of a regenerator, of a disengager or of any other internal equipment of a fluid catalytic cracking unit.

The welding is advantageously carried out in accordance with step (ii) of the process according to the invention.

The insertion of composite material is advantageously carried out in accordance with step (iii) of the process according to the invention.

The invention is now described with reference to the appended non-limiting drawings, in which.

Figures 1, 5:
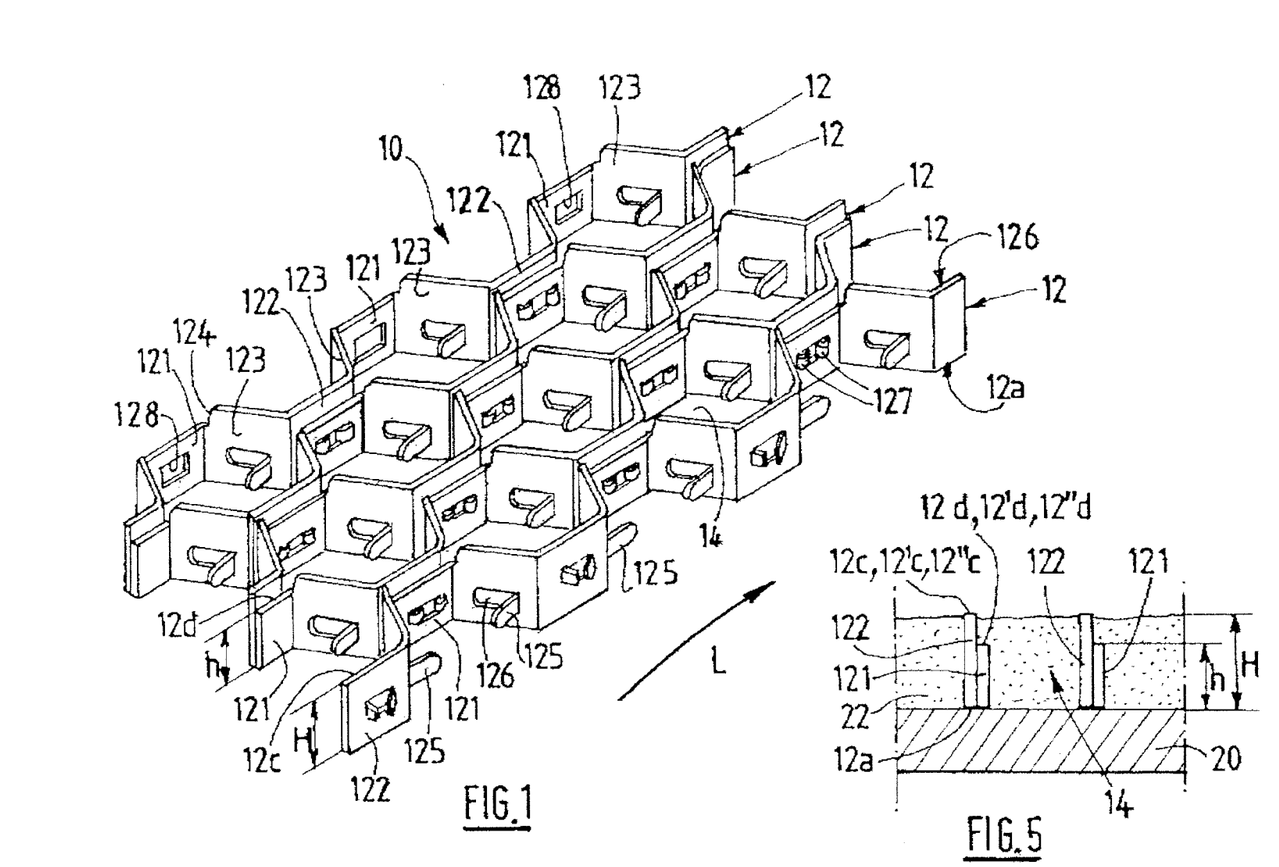
FIG. 1 is a representation, in perspective, of an anchoring structure according to one embodiment of the invention.
FIG. 5 is a cross-sectional representation of connected portions of two adjacent strips of an anchoring structure fastened to a metal wall and embedded in a composite material.

FIG. 1 represents a honeycomb metal anchoring structure 10 formed of a plurality of strips 12 connected in pairs so as to form a plurality of hexagonal cells 14 joined by their sides to one another.

The internal dimensions of the cells may vary from 4 to 6 cm for a thickness of around 1.5 to 3.0 cm.

Each strip 12, made from one part, is divided along its length into a plurality of portions 121, 122, 123:
- first strip portions 121 which extend along a first plane parallel to the longitudinal direction L of the strip,
- second strip portions 122 which extend along a second plane parallel to the first plane and different therefrom,
- third strip portions 123 which each join a first strip portion 121 to a second strip portion 122.

The first strip portions 121 and second strip portions 122 are alternated over the entire length of a strip 12 and the first portions 121 of one strip are juxtaposed and connected to the second portions 122 of an adjacent strip 12 by fastening means. The first strip portions 121 and second strip portions 122 form assembly portions within the meaning of the invention.

The anchoring structure 10 is formed from a plurality of identical strips 12. Each strip 12 has (before any shaping of the anchoring structure) a lower longitudinal edge 12a contained in a single plane and an upper longitudinal edge 12b formed of a succession of straight sections 12c and 12d that are parallel to the lower longitudinal edge 12a.

The upper longitudinal edge 12b alternately comprises low sections 12d that are a distance h away from the lower longitudinal edge 12a and high sections 12c that are a distance H, greater than the distance h, away from the lower longitudinal edge 12a. The sections 12c and 12d are thus located at different distances from the lower longitudinal edge 12a.

In the example represented in FIG. 1, the high sections 12c extend over the entire length of each second strip portion 122 and of each third strip portion 123. The low sections 12d extend over the entire length of each first strip portion 121.

Figure 4:
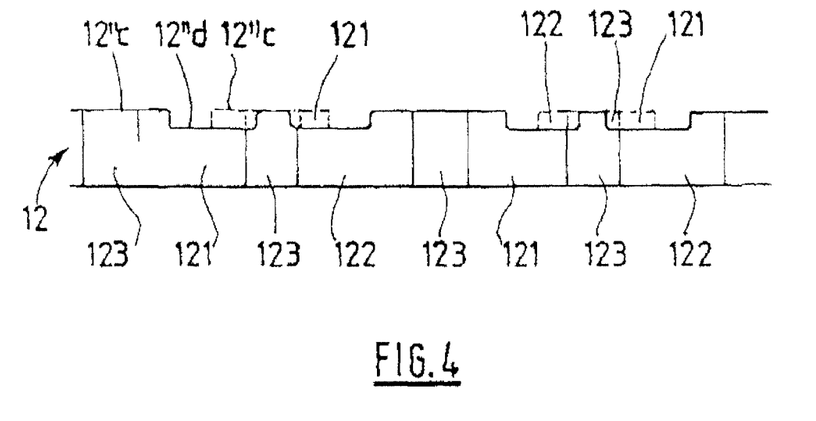
FIG. 4 represents a side view of the strips 12 shaping the anchoring structure represented in FIG. 3, one of the strips 12 being represented in solid lines, another adjacent strip 12 being represented in dashed lines for greater clarity.

The first portions 121 of each strip thus have a height h less than the height H of the second portions 122 of each strip (see also FIG. 4).

The difference H-h between the high and low sections (12c, 12d) is from 4 to 10 mm, preferably from 6 to 8 mm.

The upper longitudinal edge 12b of each strip 12 has rounded junctions 124 between the high sections 12c and low sections 12d.

The strips 12 represented also comprise flaps of material 125 cut out in each third strip portion 123. These flaps 125 are folded out with respect to said third portion in order to jut out therefrom and to form additional anchorage for the composite material which will subsequently cover the anchoring structure 10. The flap 125 thus folded out frees up its cut-out orifice 126. These flaps 125 are folded out so as to extend substantially parallel to the planes of the first and second strip portions 121, 122. Moreover, the flaps 125 of two third portions 123 of a same strip separated by a first portion 121 are folded out towards one another.

In the example represented, the means for fastening the strips 12 to one another comprise two flaps 127 per second portion 122 formed by a cut-out in the second portions 122, and a corresponding orifice 128 of the first portions 121. The fastening of the strips 12 is thus carried out very simply by introducing the flaps 127 of the second portions 122 into the corresponding orifices 128 of the first portions 121, then by folding back the flaps 127 against these first portions 121.

As a variant, each flap 127 could be introduced into a corresponding orifice or a single flap 127 could be provided per second portion 122. The flaps 127 and the orifices 128 may be positioned either on the first or second strip portions.

Other implementation means could be envisaged, such as staples or rivets that pass through the corresponding orifices of the first and second portions.

Figure 2:
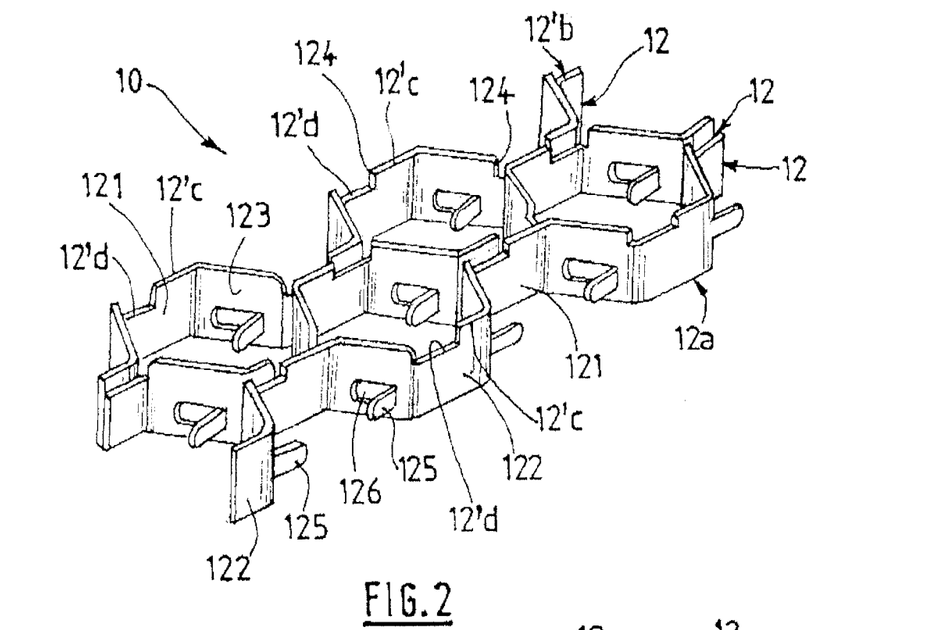
FIG. 2 is a representation, in perspective, of an anchoring structure according to a second embodiment of the invention.

FIG. 2 represents a second embodiment which only differs from that represented in FIG. 1 by the distribution of the high sections 12'c and of the low sections 12'd along the upper longitudinal edge 12b'. The other references denote elements identical to those represented in FIG. 1. In this example, the upper longitudinal edge of each first portion 121 and of each second portion 122 of a strip is formed from a high section 12'c and from a low section 12'd each having the same length.

The upper longitudinal edge of the third portions 123 is a same distance H away from the longitudinal edge as the high sections 12'c.

The difference H-h between the high and low sections (12'c; 12'd) is from 4 to 10 mm, preferably from 6 to 8 mm.

Figure 3:
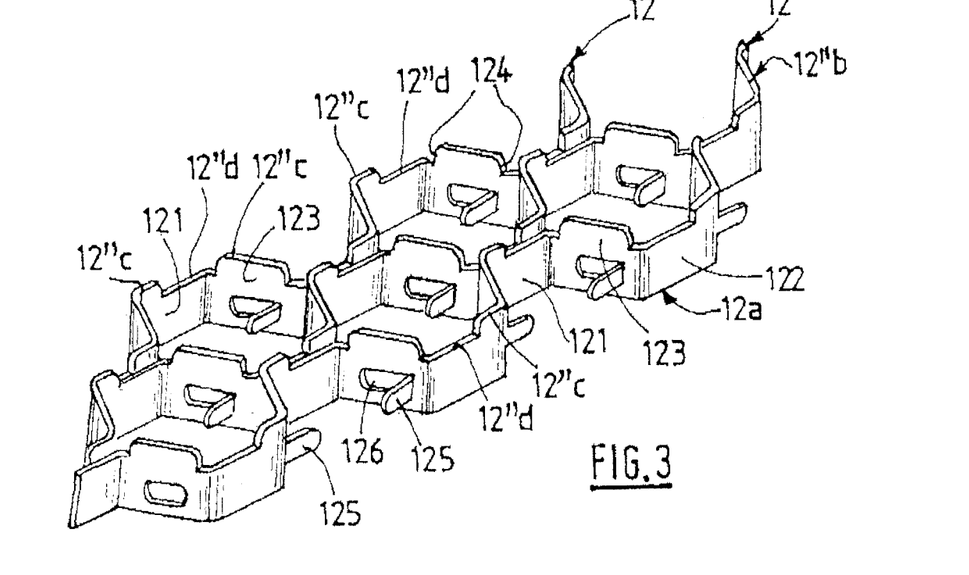
FIG. 3 is a representation, in perspective, of an anchoring structure according to a third embodiment of the invention.

FIG. 3 represents a third embodiment, which only differs from that represented in FIG. 1 by the distribution of the high sections 12"c and low sections 12"d along the upper longitudinal edge 12b". The other references denote elements identical to those represented in FIG. 1. In this example, the upper longitudinal edge of each first portion 121 and of each second portion 122 of a strip is formed from a high section 12"c and a low section 12"d that have different lengths. Thus, when the strips are connected, the high section 12"c of the first portion 121 of one strip is distant from the high section 12"c of the second portion 122 of an adjacent strip contiguous to the first portion 121, along the longitudinal direction of a strip, as can be seen in FIG. 4.

The central part of the upper longitudinal edge of the third portions 123 is at a same distance H away from the longitudinal edge as the high sections 12"c.

The difference H-h between the high and low sections (12"c; 12"d) is from 4 to 10 mm, preferably from 6 to 8 mm.

The fastening means between the assembly portions 121 and 122 of two adjacent strips 12 are not represented in FIGS. 2 and 3, but are, for example, identical to those described with reference to FIG. 1.

FIG. 4 represents a side view of the strips 12 forming the anchoring structure represented in FIG. 3, one of the strips 12 being represented in solid lines, another adjacent strip 12 being represented in dashed lines.

FIG. 5 represents a transverse cross-sectional view of an anchoring structure 10 fastened to a metal wall 20 and embedded in a composite material 22. The height of composite material 22 is substantially equal to the distance H separating the high sections 12c, respectively 12'c or 12"c, from the lower longitudinal edge 12a. The coating thus obtained completely covers the portions of height H and the interstices between the first 121 and second 122 connected strip portions, irrespective of the embodiment.

The anchoring structure 10 could be fastened to the metal wall 20 by welding.

An inner or outer wall of a chamber of a fluid catalytic cracking unit may thus be protected by proceeding in the following manner:
(i) shaping a honeycomb anchoring structure 10 so that the lower longitudinal edges 12a of the strips 12 of this anchoring structure 10 can follow the shape of the metal wall 20,
(ii) fastening the anchoring structure 10 to the metal wall 20, the lower longitudinal edges 12a of the strips 12 being in contact with the metal wall 20,
(iii) inserting the composite material 22 into the cells 14 of the anchoring structure 10 from the metal wall 20 and at least up to the high sections 12c (or 12'c or 12"c) of the upper longitudinal edges 12b of the anchoring structure.

In particular, the metal wall 20 could be a wall of a cyclone, of a regenerator or of a disengager or of any other internal equipment of a fluid catalytic cracking unit.

Generally, for the fastening thereof, the anchoring structure 10 can be multi-point welded to the metal wall 20 to be protected so as to cover the whole of this metal wall. The structure is thus anchored to the metal wall by a series of welds of the cells.

Figure 6:
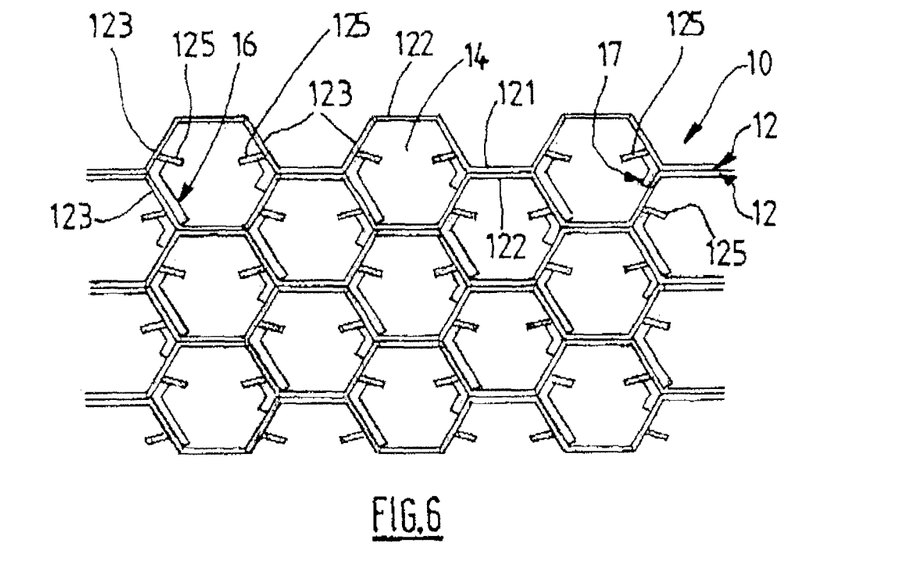
FIG. 6 represents an example of a diagram for welding an anchoring structure similar to those represented in FIGS. 1-3.

FIG. 6 represents a welding diagram that may result from the fastening step (ii) of the implementation process according to the invention. According to the diagram represented, at least one part of the lower longitudinal edges 12a of the strips is welded to the metal wall 20 so that each cell 14 is individually welded to the metal wall 20.

In the example represented, each cell 14 is welded to the wall by two welds 16, 17. These welds 16, 17 are located at the junctions between the third portions 123 of two adjacent strips 12. One of the welds 16 extends over the entire length of a third portion 123 up to a flap 125 of the third portion 123 of the adjacent strip. The other weld 17 extends over one of the third portions up to the flap 125 thereof and over the other of the third portions up to the edge of the orifice 126 freed up by the cutting out of the flap 125 (this orifice 126 is not represented in FIG. 4). Thus, when the orifice 126 freed up by the flap 125 is centred in the middle of the third strip portion (as represented in the figures), this weld 17 extends over one and the same length of each third strip portion 123.

The length of the welds 16, 17 may be different from the lengths described with reference to FIG. 5, provided that the junction between contiguous assembly portions 121, 122 of two adjacent strips and the metal wall 20 is covered by a weld.

The invention claimed is:

1. Process for producing an anti-erosion coating on an inner or outer metal wall of a chamber of a fluid catalytic cracking unit, comprising:
(i) shaping a honeycomb metal anchoring structure, said anchoring structure being formed from a plurality of strips connected in pairs so as to form a plurality of cells between two adjacent strips, in which each strip is divided along its length into a plurality of portions, including at least one series of assembly portions extending in a same plane and connected to a series of assembly portions of an adjacent strip by fastening means, each strip having a lower longitudinal edge contained in a single plane before shaping and an upper longitudinal edge, during this shaping step, the lower longitudinal edges of the strips of said anchoring structure being adapted in order to follow the shape of said metal wall, (ii) fastening said anchoring structure to said metal wall, the lower longitudinal edges of the strips of the anchoring structure being in contact with the metal wall, this fastening being carried out by welding to the metal wall of at least one part of the lower longitudinal edges of the strips so that each cell of the anchoring structure is welded to the metal wall at least at the junctions between the contiguous assembly portions of two adjacent strips, and (iii) inserting a composite material into the cells of said anchoring structure from the metal wall and at least up to the upper longitudinal edge of each strip.

2. Process for producing an anti-erosion coating according to claim 1, wherein at least one of the welds produced during step (ii) at the junction of the contiguous assembly portions of two adjacent strips extends over the entire length of at least one of the strip portions adjacent to the assembly portions.

3. Process for producing an anti-erosion coating according to claim 1, wherein the strips of the anchoring structure used in step (i) are made of austenitic stainless steel chosen from the following steels:

a stainless steel containing from 0.04% to 0.10% by weight of carbon, from 17% to 19% of chromium and from 9% to 12% of nickel, and with a niobium content of from 8 times the carbon content to 1% by weight, a steel containing at most 0.015% by weight of carbon, from 15% to 17% of chromium and from 33% to 37% of nickel, and a steel containing at most 0.10% by weight of carbon, from 24% to 26% of chromium and from 19% to 22% of nickel.

4. Process for producing an anti-erosion coating according to claim 1, wherein:

the anchoring structure used in step (i) is such that the upper longitudinal edge of each strip is formed from a succession of straight sections that are parallel to the lower longitudinal edge, the upper longitudinal edge alternately comprising low sections that are a distance h away from the lower longitudinal edge and high sections that are a distance H, greater than the distance h, away from the lower longitudinal edge, at least one part of the low sections forming the upper edge of at least one part of the assembly portions so that, when two adjacent strips are connected, each assembly portion of a strip comprises an upper longitudinal edge a distance apart from its lower longitudinal edge that is different from the distance separating the upper longitudinal edge from the lower longitudinal edge of the assembly portion of the adjacent strip to which it is connected, over the entire length of the connected assembly portions, and in which:

during the step (iii) of inserting the composite material into the cells of said anchoring structure, the composite material fills the cells from the metal wall and at least up to the high sections of the upper longitudinal edges of the strips of the anchoring structure.

5. Process for producing an anti-erosion coating according to claim 4, wherein each strip of the anchoring structure used in step (i) is such that the difference H-h between the distances H and h is from 4 to 10 mm, preferably from 6 to 8 mm.

6. Process for producing an anti-erosion coating according to claim 1, wherein the metal wall is an outer or inner wall of a cyclone, a regenerator, a disengager or any other internal equipment of a fluid catalytic cracking unit.

7. Process for producing an anti-erosion coating according to claim 1, wherein the composite material is a concrete.

8. Process for producing an anti-erosion coating according to claim 1, wherein each strip of the anchoring structure used in step (i) is divided along its length into a plurality of portions, first strip portions extending in a first plane parallel to the longitudinal direction of the strip, second strip portions extending in a second plane parallel to the first plane and different from the first plane, third strip portions each connecting a first strip portion to a second strip portion, the first and second strip portions being alternated over the entire length of the strip and the first portions of a strip being juxtaposed and connected to the second portions of an adjacent strip by fastening means so as to form hexagonal cells.

9. Honeycomb metal anchoring structure for the production of an anti-erosion coating on an inner or outer metal wall of a chamber of a fluid catalytic cracking unit, said anchoring structure being formed from a plurality of identical strips connected in pairs so as to form a plurality of cells between two adjacent strips, in which each strip is divided along its length into a plurality of portions, including at least one series of assembly portions extending in a same plane and connected to a series of assembly portions of an adjacent strip by fastening means, each strip having a lower longitudinal edge contained in a single plane and an upper longitudinal edge, the upper longitudinal edge of each strip being formed from a succession of straight sections that are parallel to the lower longitudinal edge, the upper longitudinal edge alternately comprising low sections that are a distance h away from the lower longitudinal edge and high sections that are a distance H, greater than the distance h, away from the lower longitudinal edge, at least one part of the low sections forming the upper edge of at least one part of the assembly portions so that, when two adjacent strips are connected, each assembly portion of a strip comprises an upper longitudinal edge a distance apart from its lower longitudinal edge that is different from the distance separating the upper longitudinal edge from the lower longitudinal edge of the assembly portion of the adjacent strip to which it is connected, over the entire length of the connected assembly portions.

10. Honeycomb anchoring structure according to claim 9, characterized in that each strip of the anchoring structure is divided along its length into a plurality of portions, first strip portions extending in a first plane parallel to the longitudinal direction of the strip, second strip portions extending in a second plane parallel to the first plane and different from the first plane, third strip portions each connecting a first strip portion to a second strip portion, the first and second strip portions being alternated over the entire length of the strip and the first portions of a strip being juxtaposed and connected to the second portions of an adjacent strip by fastening means so as to form hexagonal cells.

11. Honeycomb anchoring structure according to claim 10, characterized in that the low sections extend over the entire length of each first portion and the high sections extend over the entire length of each second portion, all the strips of the anchoring structure being identical.

12. Honeycomb anchoring structure according to claim 9, characterized in that the upper longitudinal edge of each assembly portion of two adjacent strips is identical and is formed from a succession of at least one high section and at least one low section.

13. Honeycomb anchoring structure according to claim 9, characterized in that the upper longitudinal edge of the strip portions located between the assembly portions is a distance H away from the lower longitudinal edge.

14. Honeycomb anchoring structure according to claim 9, characterized in that the upper longitudinal edge of each strip has rounded junctions between the high sections and the low sections.

15. Honeycomb anchoring structure according to claim 9, characterized in that the difference H-h between the distances H and h is from 4 to 10 mm, preferably from 6 to 8 mm.

16. Honeycomb anchoring structure according to claim 9, characterized in that the strips are made of austenitic stainless steel chosen from the following steels:
 a stainless steel containing from 0.04% to 0.10% by weight of carbon, from 17% to 19% of chromium and from 9% to 12% of nickel, and with a niobium content of from 8 times the carbon content to 1% by weight,
 a steel containing at most 0.015% by weight of carbon, from 15% to 17% of chromium and from 33% to 37% of nickel, and
 a steel containing at most 0.10% by weight of carbon, from 24% to 26% of chromium and from 19% to 22% of nickel.

17. Anti-erosion coating, characterized in that it comprises a honeycomb anchoring structure according to claim 9 embedded in a composite material, for example a concrete, the composite material filling each cell from the lower longitudinal edge of each strip up to the upper longitudinal edge over a distance at least equal to the distance H separating the high sections from the lower longitudinal edge.

18. Chamber of a fluid catalytic cracking unit, characterized in that it comprises at least one inner or outer wall covered with at least one coating according to claim 17, the lower longitudinal edge of each strip of the anchoring structure of the coating being fastened by welding to the inner or outer wall of the chamber.

* * * * *